United States Patent [19]

Seilenbinder et al.

[11] Patent Number: 4,745,895
[45] Date of Patent: May 24, 1988

[54] LIQUID MONITORING APPARATUS

[75] Inventors: Richard W. Seilenbinder, Hales Corners; Edward B. Hajec, Brookfield, both of Wis.

[73] Assignee: Briggs & Stratton Corp., Brookfield, Wis.

[21] Appl. No.: 32,985

[22] Filed: Mar. 27, 1987

Related U.S. Application Data

[63] Continuation of Ser. No. 787,517, Oct. 15, 1985, abandoned.

[51] Int. Cl.⁴ ............................................. F22B 5/02
[52] U.S. Cl. .................................. 123/196 S; 184/6.4
[58] Field of Search ................ 73/118, 304 R, 304 C, 73/118.1; 123/196 S, 198 DC; 184/6.4; 340/620, 59; 116/227

[56] References Cited

U.S. PATENT DOCUMENTS

| | | | |
|---|---|---|---|
| 1,856,584 | 5/1932 | Parkhill | 123/196 S |
| 2,123,460 | 7/1938 | Burschkies | 123/196 S |
| 2,123,461 | 7/1938 | Burschkies | 123/196 S |
| 2,792,566 | 5/1957 | Shanhouse et al. | 116/227 |
| 3,499,130 | 3/1970 | Norred | 184/6.4 |
| 4,203,408 | 5/1980 | Yamaguchi et al. | 123/198 DL |
| 4,256,069 | 3/1981 | Masuda et al. | 184/6.4 |
| 4,313,102 | 1/1982 | Broetto | 340/59 |
| 4,476,714 | 10/1984 | Barry et al. | 73/118 |
| 4,635,473 | 1/1987 | Hochstein | 73/118.1 |

FOREIGN PATENT DOCUMENTS

| | | | |
|---|---|---|---|
| 849770 | 7/1949 | Fed. Rep. of Germany | 340/620 |
| 0045437 | 4/1979 | Japan | 184/6.4 |
| 2136965 | 9/1984 | United Kingdom | 73/304 R |

Primary Examiner—Michael J. Tokar
Assistant Examiner—Robert R. Raevis
Attorney, Agent, or Firm—Andrus, Sceales, Starke & Sawall

[57] ABSTRACT

An electrically responsive oil level sensor is mounted within a vehicle oil sump. An enclosure encloses the ends of two spaced electrodes. The high voltage electrode has a pointed end and the other low voltage electrode has a blunt end opposed to the pointed end. The low voltage electrode is connected to ground in series with an indicator. The enclosure has three vertically spaced openings. An entrance opening is aligned with the electrode gap for in flow of oil. A second is located below the entrance opening and establishes a restricted oil outflow. The third opening is above the entrance opening for air and fume escapement. A baffle is interposed between the entrance opening and the electrode gap. The baffle prevents the motion of the oil in the sump from moving directly through the entrance opening and into the electrode gap. The enclosure has an integral tower for the high voltage electrode and the tower has annular radial projections to increase the surface creepage path.

47 Claims, 2 Drawing Sheets

LIQUID MONITORING APPARATUS

This is a continuation of application Ser. No. 06/787,517, filed Oct. 15, 1985, now abandoned.

BACKGROUND OF THE PRESENT INVENTION

The present invention relates to a liquid monitoring apparatus, and particularly to a lubricating oil monitor for internal combustion engines.

Internal combustion engines all require the presence of a lubricating oil to appropriately lubricate the moving parts including the piston and crankshaft bearings, and the like. Proper lubrication requires maintaining a minimum amount of lubricating oil in the crankcase sump. In most internal combustion engines, a dip stick unit is releasably mounted to the engine block and projects downwardly into the oil sump. The user can readily check the level of the oil in the sump by removing and viewing the extent of the oil on the dip stick. In pressurized lubricating systems, a pressure sensing switch is also conventionally mounted in the lubricating flow system. The pressure level will drop if the oil decreases below a selected safe operating level. The switch is connected into a suitable indicating system such as a gauge, light or the like to establish a readout and warning to the user whenever the oil level drops below a minimum level. In smaller internal combustion engines, pumps and associated pressurized systems may not be used. Rather, a splash lubricating system is used wherein a splash arm member on the crank unit passes through the oil in the sump and throws the oil into the operating components to provide the necessary lubrication. The conventional pressure responsive protection system is not therefore applicable to such lubrication systems.

Small internal combustion engines are often used in lawn mowers, lawn tractors and other relatively small applications. Operators of such devices often fail to adequately maintain the necessary lubricating oil in the sump. Even relatively short periods of engine operation with an inadequate oil supply may result in severe damage if not complete failure of the engine. The prior art has suggested sensing systems to replace manual monitoring of the oil level as measured by a dip stick. The prior art has also suggested the use of an automatic protective system including a sensor coupled into the engine oil sump or bath which will either shut-down operation of the engine, operate a visual or audio signal, or both, should the oil level drop to an inadequate level.

Mechanical sensor systems have been suggested for use with such splash lubrication systems. Others have suggested various electrical sensing systems. Generally, the prior art has used various float switches, capacitor switches, thermoswitches, and spark gap units located to produce a change in an electrical output with the oil level below the selected minimum level in the crankcase.

In spark gap systems, oil which is a relatively poor electrical conductor, immerses a pair of electrodes so long as the oil level is at or above the selected and safe level. The electrodes are connected into the ignition system as a source of voltage. If the oil drops below the safe level, the electrodes are exposed and conduction is permitted.

For example, U.S. Pat. Nos. 2,123,460 and 2,123,400, both of which issued on July 12, 1938 to Burschker, disclose a sensor incorporated into the oil supply tube for introducing the sensor into the oil-level checking dip tube of the engine. The sensor includes a spark gap unit mounted within the corresponding dip tube, which is grounded to the engine block. For example, a single sensing electrode is mounted in insulated relationship within the tubular dip stick which is grounded to the engine and forms the opposite sensing electrode. The sensing electrode is connected into the ignition system and is maintained at a relatively high voltage sufficient to breakdown the air between the electrode and the tubular dip tube and establish a current flow. With the oil level above a selected minimum safe level, the oil bridges the gap between the outer tube and the inner sensing electrode. The oil is a relatively good electrical insulator and prevents breakdown of the gap and conduction of current. When the oil level drops below the selected level, the high voltage establishes a current flow which is interconnected to short circuit the ignition circuit, and thereby stop engine operation instantaneously.

U.S. Pat. No. 4,256,069 which issued Mar. 17, 1981, discloses a float-operated system in which a magnetic float in a sump moving relative to a hermetically enclosed reed switch in accordance with the oil level in the sump. With a minimum oil level, the float is raised to close the switch and permit ignition. If the level drops below such level, the switch opens and prevents ignition. The detector is enclosed within a special housing within the engine sump to shield the detector from the effects of the oil splashing bars.

U.S. Pat. No. 2,529,775 which issued Jan. 20, 1948, to Maddox discloses a pressure responsive electrical switch unit having a pair of spaced electrodes. A float ball, formed of a conductive material, is gravity biased into a engagement with the electrode to complete a circuit. When the engine is started and the oil level is above a selected minimum safe level, the oil pressure increases, and lifts the ball from its normal circuit closing position thereby opening the circuit and allowing normal ignition. If the oil level drops, the ball returns to its normal seating position and contemplates the short circuit, and thereby stops engine operation. U.S. Pat. No. 4,203,408 which issued May 2, 1980, to Yanagushirt et al discloses another pressure responsive unit operating a special diaphragm type actuator. Such systems cannot operate in the usual "splash" lubricating system.

These and similar suggestions are available for automatic monitoring of the oil level. Such systems have not found wide acceptance and application in commercially available engines of the splash lubrication system. Although, the cost associated with automatic sensors may often be justified, the accuracy and reliability of available sensors, as well as possible erroneous response appears to have significantly eliminated any significant commercial application, particularly in small engines using a "splash" lubrication system.

Further at stand still and with the engine shut down, the oil level does provides an accurate indication of the adequacy of the oil supply if the engine is in a appropriate level position to locate the oil relative to the sensor such as the dip stick. The dip stick is normally applied to the side of the engine. If the engine is significantly tilted either laterally or longitudinally with respect to the position of the dip stick, the oil level in the sump will flow to a corresponding low point. This may change the apparent level at the dip stick. In a inclined or tilted position, the oil level may therefore obviously indicate that an inadequate supply is available. Generally, the user is instructed to check the oil level with the engine in an appropriate horizontal level position. If an automatic sensor is inserted into the system with the dip stick unit, an erroneous indication may be generated whenever during use, the engine is tilted as a result of the movement of the engine with the vehicle on an inclined surface.

During actual engine operation of an engine on a lawn mower or other moving vehicle, the oil bath is also in constant motion as a result of the movement of the vehicle and the spash bar. The movement of the vehicle will create an inherent motion of the oil bath in the sump often creating a wave-type motion.

The usual vibration associated with engine operation will also cause some oil movement. In addition in a splash-type lubrication system, a splash bar secured to the engine crank may move the oil from the sump into the engine parts to create the necessary lubrication, and thereby creates further agitation and motion of the oil.

Even with the oil level in the engine within the normal safe limits as indicated for example on the dip tube, the motion of the oil, with respect to the automatic sensor particularly in "splash" lubricated engines will often create a momentary indication adjacent the sensor of a low level condition. Although the condition may exist for relatively short periods of time, the sensors will often respond to give an erroneous indication. Where the sensor is merely connected to provide a visual indication no significant problem may be created and the operation may be acceptable. The sensor is however desirably interconnected as shown in the above prior art to automatically stop the engine. In most systems, the cut-off unit provides for automatic restart upon resetting of the oil with respect to the sensor. Alternatively, a manual reset may be required by the operator upon automatic shutdown. In either event, erratic operation of the sensor would at the very least be annoying to the operator as well as economically undesirable where the engine is installed in a commercial profit making operation. The resulting erratic engine operation under such condition will almost universally be unacceptable.

The inventors have realized that the basic difficulty with the prior art systems resides in attempting to measure the oil level whereas in fact the measurement so far as possible should be the volume of oil in the engine. Further, in monitoring the volume of oil, it is highly desirable to monitor relatively small changes in the volume, particularly at and around the selected safe oil volume for establishing minimum desired lubrication of the engine. The wave motion and "splash" lubricating action associated with the oil bath during system operation particularly create difficulty in the use of the oil level as a reference, or measuring of the volume of oil present.

In addition, sensors having a switch connected in the high voltage ignition system may create other practical problems. The connection of the one electrode in a high voltage system requires that a reliable interconnection be maintained in the severe vibration environment associated with the engine as well as the probable presence of large volumes of foreign matter in the surrounding air. Thus, the connection must be physically rugged. In addition, the connection must anticipate the accumulation of foreign matter on the outer surface of the electrode mounting which would tend to create a bypassing current from the electrode directly to the engine ground. The system should of course, for optimum system operation, provide accurate and similar indication of the oil supply independent of the physical orientation of the engine within the normal operating conditions. Thus as applied to a vehicle, lawn mower or other device adapted to diverse a ground area, the same indication should be given as long as the implement is in appropriate operative ground engagement. However, it is desirable that in the event of undesirable tipping of the engine for example to one side or both, that automatic stopping of the engine will be created.

Finally, the cost of the system must be maintained at a reasonable level particularly for mass production required for mass produced relatively small "splash" lubricated engines.

SUMMARY OF THE PRESENT INVENTION

The present invention is particularly directed to an electrically responsive oil or lubricant sensor for effectively sensing the volume of the lubricant available for lubrication of the engine.

Generally in accordance with the teaching of the present invention, an electrically responsive sensor means is mounted within the oil sump within a special flow control enclosure having communication with the lubricating oil bath, with the enclosure specially constructed and arranged to establish a control flow and interchange of the lubricant into and from the bath with respect to the electrically responsive sensor means. The enclosure is particularly constructed and arranged to maintain the electrically responsive means immersed within the lubricant within the enclosure so long as an adequate volume of the lubricant is available for the desired lubrication of the engine. The controlled interchange of the lubricant between the enclosure and the oil sump is such that the sensor can reliably operate within the conventional environment encountered in "splash" type engines. The wave motion, vibration motion and rapid splash motion in the oil sump does not, in the construction of this invention, interfere with the accurate and repeatable sensing of the effective minimum volume of the lubricant in the sump.

More particularly in accordance with the teaching of the present invention, the electrically responsive means, preferably a spark gap electrode unit having spaced electrodes defining a spark gap, is secured to a mounting member. Both of the electrodes are preferably supported in an insulating support. One of the electrodes is a high voltage electrode to be connected into the high voltage side of the ignition system. The other electrode constitutes a common, which may be connected directly to the ground side of the engine or alternatively to a ground through a suitable indicating or readouts device. An electrically insulating enclosure or housing is secured to the mounting member which may form one wall of the housing. The housing is spaced slightly from the electrodes and is provided with a plurality of vertically spaced openings, including at least one which is substantially at the vertical height of the sensor gap and provides for entrance of oil or lubricant into the enclosure and the other of which is located below such entrance opening and provides for a restricted exit or outflow of the lubricant from the enclosure. For most effective and responsive operation, a third opening is preferably provided located above the entrance opening to prevent entrapment of air and other fumes within the enclosure. A baffle unit is interposed at least between the entrance opening and the spark gap. The sensor under normal system operation rapidly fills with the lubricant and is filled at initial start-up. When the enclosure is filled with oil, the spark gap is immersed in the oil and effectively prevents current flow. During the system operation the wave motion and the splashing lubricant in the sump tends to maintain an erratic supply of the oil to the enclosure at the entrance opening at the enclosure. Applicant has found however that the controlled entrance and discharge of the oil to and from the separate small enclosure provides a very accurate and highly reliable determination of the availablity of an adequate supply of lubricant to the engine. When the volume of oil decreases below the designed minimum volume, the differential in the supply and the controlled restricted discharge of the oil from the enclosure is such that the oil level in the enclosure decreases below the gap level and provide automatic break over and current flow through the spark gap and the interconnected circuit. The relatively small volume of the oil within the enclosure does not create any effective disturbance as the result of wave, vibrations, splash or the like but is rather a relatively stable body of oil within which the electrodes are normally immersed.

In accordance with an optimum construction of the present invention, the inventor has further discovered that the enclosure should be designed and constructed with the baffle unit to prevent the motion of the oil in the sump from moving directly through the entrance opening into the gap area. Thus under certain operating conditions, the central opening in the enclosure could permit the rapid moving oil to move into the enclosure to momentarily bridge the gap across the spark gap of the sensor. With the rapid response of the sensor, the engine would automatically re-ignite and momentarily initiate engine operation. The inventors have discovered that a simple reliable solution, and one permitting an optimum operational construction, is provided by incorporation of the baffle unit between the spark gap and the entrance opening of the enclosure. The baffle unit functions to prevent the entering oil from moving directly into the spark gap and effectively establishes the response to the oil level within the enclosure which in turn is accurately reflective of the volume of oil in the engine sump.

The baffle unit in a preferred construction is essentially a solid plate corresponding to the internal configuration of the enclosure adjacent the spark gap. The plate includes small edge notches on the side edges generally in alignment with the spark gap and the inlet opening. The baffle unit creates a barrier to the oil entering directly through the inlet opening and requires the oil to flow laterally about the baffle unit. Flow openings are defined by the edge notches and the oil thus enters into the enclosure about the spark gap to the opposite sides of the spark gap and cannot enter directly into the spark gap.

In a practical construction, the outer housing has a width slightly greater than the thickness of the electrodes and a vertical height, slightly greater than the spacing of the electrodes. The housing is releasably secured to the support to define the minute enclosure. Thus, the enclosure has a substantially greater depth than width to correspond to the location and placement of the electrodes and to define a relatively narrow and deep reservoir and enclosure extending to the opposite sides of the spark gap.

The outer end of the enclosure is provided with three vertically spaced openings including a centrally located opening for defining the oil entrance opening, a small bottom opening defining the restricted discharge opening and a top opening defining an air release opening. A baffle plate is secured within the housing and located between the electrodes and the outer end wall of the enclosure housing. The baffle plate defines an intermediate chamber adjacent the outer wall of the enclosure. The baffle plate has the side edge notches with the lower edge of the notch aligned with the entrance opening for free flow of oil around the baffle plate. The bottom end of the baffle plate has a small discharge opening aligned with the discharge opening in the enclosure. The small discharge opening in the baffle is preferably slightly less than that in the enclosure to establish a lesser flow rate through the baffle opening and insure the proper responsive oil level in the sensing chamber.

In addition at stand still, and with the engine at an appropriate operational orientation, the oil level in the enclosure will correspond to the desired oil level in the oil sump. The present invention thus also provides an oil level sensor as well as volume sensor under operating conditions.

In an optimum oil sensor for a small internal combustion engine including a splash lubrication system, the sensor of the present invention includes an insulating mount or support, such as a molded plastic support which is adapted to be releasably secured within a side wall opening of the engine crankcase. The spark gap electrodes are rod-like electrodes embedded within and extending through the molded support. The inner ends of the electrode are bent to extend toward each other. The end of the top electrode, which is connected as the high tension electrode, is formed an essentially sharp pointed end. The opposed bottom electrode, which is connected as the common or return electrode, is formed with a relatively blunt end. The mount is specially constructed to cooperate with the crankcase opening to ensure a vertical orientation of the spacer with the pointed electrode as the top electrode and the blunt electrode as the bottom electrode. The inventors have discovered that this electrode tip formation minimizes erratic operation resulting from the retention of oil between the tips of the electrodes as the result of surface tension. The tip formation thus provides an essentially instantaneous effective response to the dropping of the oil level within the separate enclosure below the safe volume.

In addition, the housing electrode support is formed with an integral outwardly extending tower about the high tension electrode. The tower includes a plurality of adjacent annular radial projections to significantly increase the surface creepage path between the high tension electrode and the engine crankcase. The increased surface path minimizes the probability of creation of parasitic currents from the high tension electrode to the electrical ground defined by the engine crankcase and block.

The construction of the support and the crankcase opening is selected to effectively locate the spark gap at the very center of the oil sump and at the selected minimum safe oil level. The system operates in accordance with the present invention to monitor the adequate oil volume, while simultaneously providing response to undesirable tipping of the engine from its normal operating position and environment.

Further, in a vehicle ignition system using a magneto power supply the sensor is connected to the output of the magneto either through a tapped connection to the spark plug wire or through a separate high voltage sensor wire connected to the coil. If the sensor is connected to the spark plug wire, the connector should be constructed to avoid possible leakage of moisture into the connection. Thus, any moisture leakage would seriously degrade the engine operation. A separate connection wire minimizes the possibility of a moisture leak in the ignition system such as may occur at a tapped connection to the spark plug wire.

The inventors have found that the present invention provides a very accurate and reliable and repeatable response to changes in the liquid level within the oil sump which in fact truely reflects the effective volume of lubricating oil within the sump and available for effective lubrication of the internal combustion engine.

The presence of water and other conductive foreign matter in a lubricant may also adversely effect the lubricating characteristic. Although not generally considered of great significance in the monitoring of the lubricant for internal combustion engines, a severe problem is encountered in the lower unit of outboard motors of marine propeller drives and the like. The propeller is mounted for submersion with a lower unit having a gear drive which couples the propeller shaft to the engine drive. The lower unit is filled with a suitable lubricant for effective long-life operation of the gear drive. As the result of the submersion and operation within a marine environment, water often enters into the lubricant cavity. Any significant accumulation of water can result in an ineffective lubricant with damage and eventual destruction of the gears in the lower unit. A sensor of the present invention can of course be readily incorporated into such a lower unit to continuously monitor the presence of water in the lubricant based on the difference in the conductivity of the lubricant and water. Similarly, the sensor of this invention may be applied to transmissions, other gear drives and the like.

The sensor apparatus is readily constructed using present day technology and can be rapidly and efficiently mass produced as a high quality product at a reasonable commercial cost. The present invention thus provides a significant advance in the accurate determination of the availablity of the proper volume of lubrication for internal combustion engines and the like as well as permitting monitoring of the presence of other foreign conductive matter such as moisture and water within the lubricant.

BRIEF DESCRIPTION OF DRAWINGS

The drawings furnished herewith illustrate the best mode presently contemplated for the invention and is described hereinafter.

In the drawings.

DESCRIPTION OF ILLUSTRATED EMBODIMENT

Figures 1, 2, 3, 4, 5:
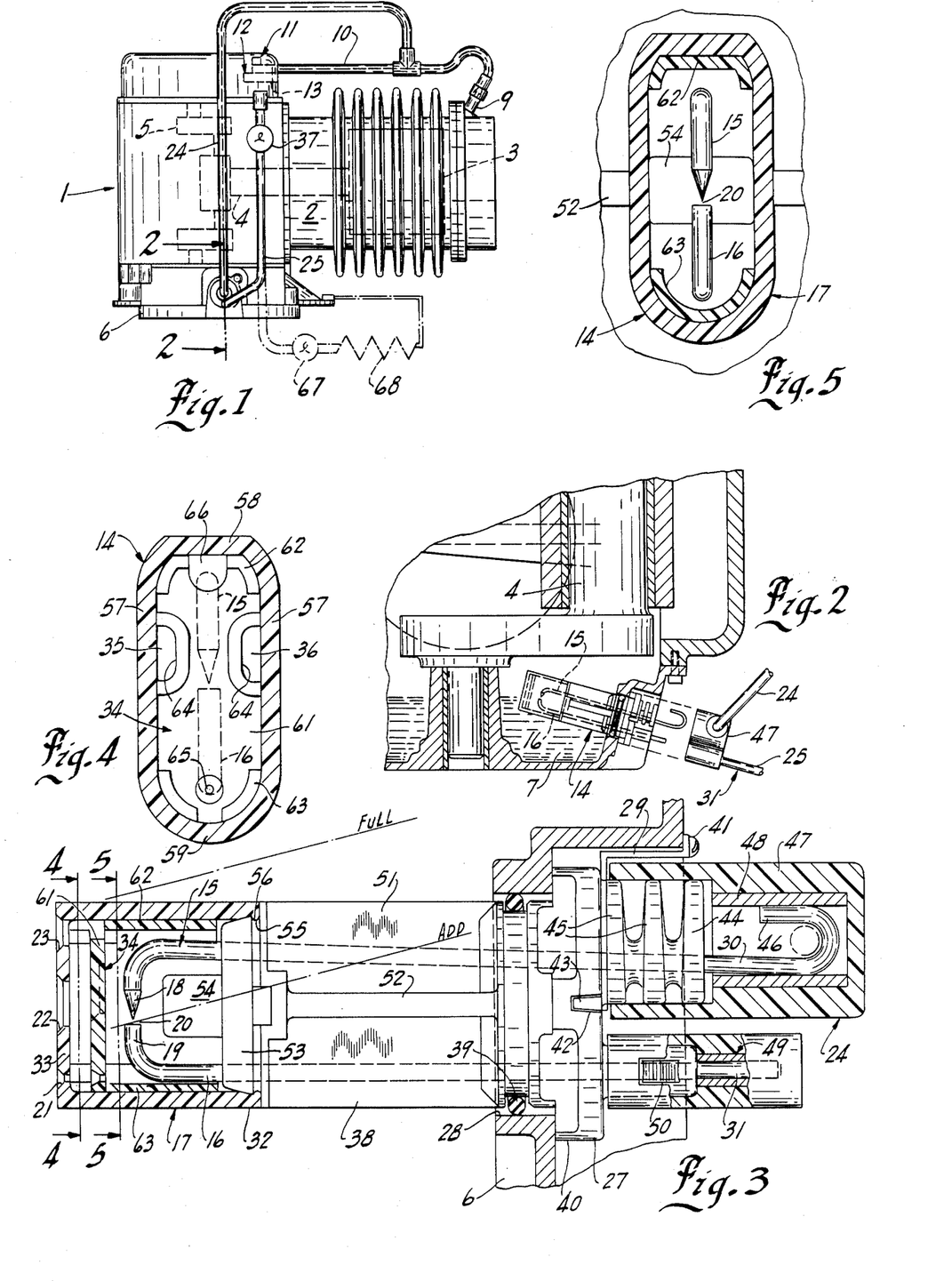
FIG. 1 is a simplified elevational view of a four cycle internal combustion engine having a vertical crankshaft with a splash lubrication system.
FIG. 2 is an enlarged vertical fragmentary section through the internal combustion engine illustrating the mounting of an oil sensor constructed in accordance with the teaching of the present invention.
FIG. 3 is an enlarged sectional view of the sensor unit illustrated in FIG. 2.
FIG. 4 is a transverse vertical section through the sensor shown in FIGS. 2 and 3 and taken on generally line 4—4 of FIG. 3.
FIG. 5 is a transverse vertical section through the sensor shown in FIGS. 2 and 3 and taken on generally line 5—5 of FIG. 3.

Referring to the drawings and particularly to FIGS. 1 and 2, a small single cylinder internal combustion engine 1 of the vertical drive orientation type is illustrated. The engine 1 is typical and includes a block and head 2 within which a reciprocating piston 3 and crank 4 are operatively mounted. Crank 4 is journaled on a crankshaft 5 which is rotatably mounted to the lower end of the block 2. The bottom of the engine block 2 is closed by a crankcase or oil cover 6 and defines an oil sump or chamber. A lubricating oil 7 fills the sump to a selected minimum level. A splash bar, not shown, may be coupled to the lower end of the crank 3 and moves through the oil 7 to promote the splash lubrication of the bearings, piston and associated operating components as the result of the rotational motion of the crankshaft and crank. A spark plug 9 is secured in the head of the engine block head. A high tension lead 10 connects the spark plug 9 to a high tension power supply such as a magneto coil 11. An ignition magneto 12 includes a magnetic core unit 13 coupled to a magneto driven by the engine to energize coil 11 and establish a high voltage on the spark plug 9 at the proper time in each cycle of the reciprocating piston. The ignition system may be of any desired or known construction. Because such constructions are well known and anyone of a great number of different varieties may be used, with the present invention, the magneto unit 12 is shown in block-type illustration only.

The volume of oil 7 in the sump must be maintained at a selected minimum level for proper engine lubrication. The particular level will depend upon the particular construction of the internal combustion engine. The level may be manually checked by the use of a dip stick unit, not shown, which is releasably secured to the block and extends downwardly into the oil 7 in the sump. In the illustrated embodiment of the invention, a sensor unit 14, constructed in accordance with the present invention, is secured in the lower end of the motor and particularly is shown mounted to cover 6. The sensor unit 14 projects inwardly into the oil sump with the innermost end located generally centrally of the horizontal location of the oil 7 with the engine in a horizontal plane. As more fully developed hereinafter with reference to FIGS. 2–5, the sensor unit 14 includes a pair of opposed vertically oriented electrodes 15 and 16 housed within an outer enclosure 17. The electrode tips 18 and 19 are spaced from each other to define a spark gap 20. A plurality of openings 21, 22 and 23 provide for a controlled flow of oil 7 into and from the enclosure 17. With the ends or tips 18-19 of the electrodes covered with oil 7, a high resistance path is presented therebetween preventing conduction under normal operating conditions. When the oil 7 is not present and the tips 18-19 of the electrode are exposed, the firing voltage from unit 12 is sufficiently great to breakdown the gap 20 and develop a conducting atmosphere within the gap, establishing conduction through the gap 20 and the electrodes 15-16.

The electrode 15 is connected by a high voltage lead 24 to the high voltage lead 10 for the spark plug 9. Electrode 16 is connected by a separate return connection lead 25 to the ignition unit 12. The circuit connection established by leads 24 and 25 is such as to effectively short-circuit the spark plug 9 to ground upon conduction between the electrodes 15 and 16. In this manner, the engine will automatically cease operation in response to conduction through the sensor unit 14.

The present invention is particularly directed to the construction of the sensor unit 14 for monitoring the volume of lubricating oil 7 available in the engine 1. The engine and other components may be of any desired construction and no further description of the engine is given other than as necessary to fully and completely describe the illustrated embodiment of the present invention. The construction of unit 14, and its physical mounting as a part of the engine and its connection into the electrical system to establish and maintain accurate, reliable and repeatable monitoring and indication of the volume of available lubricating oil is clearly shown in the drawings and described as follows.

More particularly, and as more clearly shown in FIGS. 2 and 3, the illustrated embodiment of the unique sensor unit 14 includes a molded plastic mount or support block 27 with the sensing electrodes 15-16 embedded and molded therein. The block 27 includes a cylindrical member or portion which mates with an opening 28 in the sidewall of the crankcase cover 6 and is releasably clamped therein by a clamping bracket 29 to seal the opening. The electrodes 15-16 are rod-like electrodes which project through the block 27 to define the inner sensing electrode tips 18-19 as well as integral external connectors or terminals 30 and 31.

The inner end of each electrode is formed as an L-shaped member to define the pair of opposing spaced tips 18 and 19 located in vertically spaced orientation. The length of the spark gap 20 is selected and constructed in relation to the circuit connections including the spark plug 9 such that in the absence of insulating oil 7 bridging the gap, the high voltage breakdown of the air between the gaps establishes conduction. Inversely in the presence of oil 7 bridging the gap between the electrode tips, the circuit between the terminals is essentially held open. The gap 20 may for example be slightly less than the spark plug gap, although the inventors have found that the system will properly respond even with the gap as large as that of the spark plug.

The enclosure 17 includes a cup-shaped housing 32 is secured to the innermost end of the support block 27 and encloses the inner portions and tips of the electrodes 15 and 16, and with an inner portion of block 27 forms the enclosure 17 which in turn defines a separate relatively minute chamber closely enclosing the electrodes 15 and 16 and in particular the opposed tips 18 and 19 and the spark gap 20. The outer end wall 33 of the housing is provided with the three vertically spaced openings 21, 22 and 23 which in the illustrated embodiment of the invention includes the centrally located entrance or inlet opening 22 for admitting oil 7 from the sump 7 into the enclosure and the sensing chamber. The bottom opening 21 defines a restricted discharge or exit flow path for establishing controlled flow of the oil 7 from the sensing chamber. The top opening 23 as shown provides free exit of air from within the sensing chamber whenever oil enters through the entrance opening 22 and/or the discharge opening 21. With a full oil fill under which the opening 23 is also submerged the sensing chamber will however fill with oil because the air will inherently rise to opening 23 and exit therefrom. Removal of air is significant. Air in the chamber would expand with the operating temperature and may create an air bubble sufficiently large to enter the gap and establish conduction with a resulting erroneous shutdown. The openings thus provide for a controlled flow of oil 7 between the sump and the sensing chamber.

In addition, the in-flow from the sump into the sensing chamber within enclosure 17 is further modified by a baffle unit 34 mounted within the sensing chamber. The baffle unit 34 is located between the entrance opening 22 and the spark gap 20 and prevents direct entrance of the oil 7 from the opening 22 into the sensing gap 20. The illustrated baffle unit 34 is shown as a wall provided with lateral edge openings 35 and 36 for allowing the oil to move laterally about the baffle wall into the sensing chamber containing the sensing electrodes.

The construction of the openings 21-23 in the housing and the baffle unit 34 is such that during the normal operation of the engine, transfer of oil 7 from the sump into the sensing chamber is permitted to maintain the tips 18 and 19 of electrodes 15 and 16 immersed within the lubricating oil.

The baffle structure or unit 34, however, prevents erroneous operation of the system as a result of the rapidly moving oil within the crankcase and into the sensing chamber. Thus, any oil which moves rapidly into the sensing chamber will engage the baffle 34 and first fill the chamber portion between the outer end wall and the baffle unit. The oil is then allowed to flow freely through the offset openings 35 and 36 into the sensing chamber and about the electrodes 15 and 16 and the spark gap 20. During normal operation and with a minimum level or volume of lubricating oil for adequate lubrication, the spark gap 20 has a high resistance preventing conduction therethrough. When the volume of oil drops below a selected minimum safe level, the volume of lubricating oil within the sensing chamber is insufficient and drops below the level of the lower electrode tip 19 and conduction is permitted whenever a high voltage signal is created at the high voltage lead 10 and the connecting lead 24. The present invention which depends on the flow of the liquid to and from the sensing chambers will generally require design for a particular operating condition because the viscosity and flow rate may vary therewith. For example, the lubricating oil 7 of an engine will change significantly as the engine begins operation and the operating temperature increases. For internal combustion engines, the unit will be designed for the heated condition which is reached within 10 to 15 minutes of engine operation.

The inventors have discovered that the use of the special minute sensing chamber defined by an enclosure closely enclosing the electrodes and the gap, and constructed and arranged with appropriate controlled ingress and egress of the lubricating oil with respect to the sump produces accurate and repeatable sensing of the volume of the lubricating oil. With the engine at a standstill, the lubricating oil level will be such that the sensor unit 24 is covered and the oil rapidly fills the sensing chamber. The unit thus also provides an oil level sensor at a stand-still.

In addition, the location of the sensor 14 at the essential central locations in the normal horizontal plane of the sump provide accurate level sensing essentially independently of the position of the engine within the normal accepted tilting of the engine from such horizontal plane. In the event of a complete tipping of the engine from the normal horizontal position to an excessive tilt or vertical position, either of standstill or while in moving operation, the oil 7 moves to one side of the sump with exposure of the spark gap 20 to establish instantaneous shut-off of the engine.

The present invention, in the preferred embodiment, has been found to establish means for accurately sensing rather small changes in the volume of lubricating oil at the selected safety level or volume. The system is essentially immune to the erratic environment created by the splash lubrication system, the vibrational operation of the engine and the wave motion of the oil and the like. A highly repeatable response is obtained with various operating conditions and over the normal life of the engine and the sensor unit. Further, the system and the components are based on present day technology permitting the economical and practical mass production of the sensor.

The insulated high tension lead 24 and the insulated return lead 25 are specially constructed to permit connection of auxiliary components or indicating devices and the like into the output of the sensor. Thus, if desired, an indicator such as a light unit 37, as shown in FIG. 1, may be connected in series with the return lead 25. Although the system is at high voltage where the spark gap 20 is connected in a high voltage tension system, the current level is rather minute and consequently a small inexpensive lamp unit, such as a light emitting diode, can be conveniently connected into the circuit of the return lead.

More particularly, in the illustrated embodiment of the invention, the support block 27 is shown as an internal molded plastic cylindrical member having an inner projection portion 32. The rod-like electrodes 15 and 16 are molded in place and extend axially through the mounting block 27 and the inner projection portion. The cylindrical block 27 fits in the receiving opening 28 in the wall of the crankcase cover 6. An O-ring seal 39 is located in the periphery of the molded support 27 and in the assembled relation, provides a reliable liquid-tight seal of the opening. The outer end of the support block 27 is formed with a flange 40 adapted to abut the outer exterior of the crankcase cover 6 for locating of the electrodes. The clamp plate or bracket 29 is releasably secured to the exterior of the crankcase as by a clamping bolt 41, and extends over the support block 27 for clamping of the sensor unit 14 in sealed relationship to the crankcase.

The support 27 is preferably formed with a complementary keying portion which requires insertion of the unit in a single orientation corresponding to the vertical orientation of the electrode tips 18 and 19 within the crankcase in the normal horizontal operating plane. The illustrated keying portions are shown as a pair of differently shaped recesses 42 located on diametrically opposite sides of the support 27. The bracket 29 is formed with a pair of arms having end, projections 43 corresponding to the shape of recesses 42 such that the bracket can be mounted only with the support 27 oriented with the electrodes in proper orientation. Any other suitable keying means may of course be used.

Further, the keyed orientation maintains the pointed tip electrode 18 as the upper electrode. The blunt electrode 19 is conversely located as the bottom electrode. The blunt tip is shown with a preferred construction having a flat, cylindrical surface. The combination of the upper pointed tip 18 aligned with the lower blunt tip 19 provides for a long life spark gap unit, while simultaneously avoiding erroneous response as a result of oil retention within the gap 20 because of surface tension phenomena. As the oil quantity drops, the oil within the sensing chamber drops below the level of the gap 20. However, surface tension phenomena associated with oil 7 tends to cause the oil to cling to the surfaces of the electrode tips 18 and 19, and the oil may in fact bridge the small spark gap 20 which may be on the order of 0.004 thousandths of an inch. The pointed end of tip 18 essentially eliminates such phenomena and insures that as the oil level within the sensing chamber drops below the gap 20, the gap is exposed to the surrounding environment to permit conduction when the high voltage firing signal is generated by the ignition unit.

The terminal ends 30 and 31 of the electrodes 15 and 16 project outwardly axially of the mounting block support 27. A high tension tower 44 is integrally molded with the mounting block 27 about the high tension terminal 30 of the high voltage electrode 15. The tower 44 is formed with a plurality of circumferential recesses defining circumferential or annular surface extensions 45. The tower thus establishes and defines a significant extended exterior surface between the crankcase 6 and the outer terminal 30 of the electrode 15. This establishes a long creepage path, thereby essentially minimizing and eliminating parasitic currents tending to flow from the high voltage electrode to the crankcase and thus the ground.

The outer terminal 30 of the high voltage electrode 15 is formed with a connecting U-shaped loop terminal 46 for plug-in interconnection to the complementing end of the high tension wire connector 24. The high voltage end is thus uniquely formed with respect to the ground terminal 31 of electrode 16 to essentially prevent the erroneous interconnection of the terminals to the high tension lead 24 and the ground return lead 25. The high voltage lead 24 terminates in a boot 47 having an inner tubular connector 48 for resiliently frictional engagement with the loop terminal 46 to create a pressure engagement. The boot 47 extends over and frictionally engages the tower 44 to firmly hold the connection 48 in place. The return electrode and, return or ground lead 25 are shown connected by simple pin and socket connector assembly 49 with a mechanical slip-type latch 50.

The inner portion of the support 27 has a cruciform shape including a vertical wall 51 slightly thicker than the electrodes, which are embedded therein, and a short cross bar wall 52. An oval mounting wall 53 is integrally formed on the outermost end of the cruciform portion and includes a center projecting wall 54 extending outwardly therefrom. The projecting wall 54 terminates in spaced relation to the electrode tips 18 and 19. The mounting wall 53 has a tapered portion with a circular recess 55 at the inner end. The outer enclosure housing 32 is similarly shaped and is adapted to telescope over the tapered wall 54. The housing 32 has an inner edge ridge 56 which snaps into the recess 55 to releasably secure the housing in place. The housing 32 and wall 54, as more clearly shown in FIGS. 4 and 5, are formed of an elongated configuration. Referring particularly to the housing 32, the housing 32 includes relatively long flat side walls 57 interconnected at the opposite ends by a flat top wall 58 and a curved bottom wall 59. The housing 32 includes the outer end 33 wall which is also a flat wall integrally formed with the other walls. The side walls 57 are spaced only slightly more than the width of the mounting wall and the projection wall and is somewhat greater than the diameter of the electrodes 15 and 16 to space the walls outwardly from, but reasonably close to the electrodes. Similarly, the flat top and curved bottom walls 58 and 59 are spaced from the corresponding top and bottom electrodes respectively. The length of the side and end walls are selected and constructed such that with the housing telescoped over the mounting ridge, the outer flat end wall 33 is spaced outwardly from the electrode tips 18 and 19, as shown most clearly in FIG. 3.

The several flow control openings 21, 22 and 23 are formed in vertically spaced relation in the end wall 33. The openings 21-23 are generally all circular openings having countersunk portions on the exterior of the end wall 33. The entrance opening 22 is generally aligned with the spark gap 20 of the electrodes. The opening 22 is shown relatively large compared to the bottom discharge opening 21. The entrance opening 22 provides for reasonably free movement of the oil 7 between the sump and the sensing chamber. The top or upper opening 23 is provided to prevent trapping of air within the chamber and particularly between the entrance opening and the uppermost end of the chamber. The top opening 23 is preferably slightly smaller than the entrance opening to restrict the flow of oil through the upper end of the chamber, while permitting free movement of air from the chamber. In the illustrated embodiment, the air release opening is shown approximately two-thirds the size of the oil inlet opening.

The bottom discharge opening 21 is substantially smaller than the inlet opening 22 and the air exchange opening 23. The size of the discharge opening 21 is the most critical of the several openings in that it provides for the controlled outflow of the oil from the sensing chamber and thus controls the response characteristic of the sensor 14. With the conventional operation of the engine and by providing a relatively large and unrestricted inlet, the supply of oil to the chamber will be essentially constant so long as there is an adequate supply of lubricating oil. Under such conditions, the supply will always be sufficient to maintain the spark gap 20 immersed within the oil 7.

The discharge opening 21 must of course be sufficiently small so that the oil flows from the chamber at a slower rate than it enters. The size of the discharge opening with an adequate volume of oil 7 in the engine is not particularly critical. Regardless of the opening size, sufficent oil will normally be maintained to immerse the gap. However, as the volume of oil decreases, the size of the discharge opening 21 must be constructed and arranged to prevent a too rapid discharge of the oil from the sensing chamber. As the critical volume is reached, the discharge rate should be slightly greater than the supply such that the level within the special small sensing chamber rapidly drops below the gap position in the sensing chamber. The use of the relatively small sensing chamber closely enclosing the electrode tips and spark gap 20 permits accurate detection of small changes in volume and significantly, in a repeatable manner. In this manner, the system will continuously and reliably monitor the availability of an adequate supply of lubricating oil.

The outer flat end wall 33 of the housing is spaced from the electrode tips 18 and 19. The baffle unit 34 is mounted within the housing and particular in spaced relation to the end wall 33 and to the tips 18-19 to form an intermediate chamber adjacent the sensing chamber enclosing the gap 20.

In the illustrated embodiment of the invention, the baffle unit 34 is formed as an integral member having a baffle plate 61 with an outer configuration essentially corresponding to the interior cross section of the sensor housing 32. Top and bottom mounting arms 62 and 63 are secured to the top and bottom ends of the plate 61 and extend in opposite directions from the plate. The arms 62 and 63 have a cross section conforming to that of the top and bottom walls 58 and 59 of the housing 32 and the baffle unit 34 is inserted into the housing with a light pressure fit permitting hand insertion. The projection of the arms 62 and 63 to one side of the plate 61 define locating members which engage the flat end wall 33 of the housing and properly locate the baffle plate 61 within the housing, in appropriately spaced relation from the end wall 33 to define an intermediate chamber. The baffle plate 61 is also properly located and spaced from the electrode tips 18 and 19 by the opposite projection of arms 62 and 63 to form the sensing chamber about the electrode tips and gap 20.

The baffle plate 61 is provided with similar rectangular shaped edge notches 64 which, with the adjacent side walls of the housing, define the openings 35 and 36 between the outer chamber and the sensing chamber. The notches 64 are located with the lower edge generally vertically aligned with the spark gap 20. The notches 64 are formed of a dimension to permit the free interchange and movement of the oil between the outer chamber and the sensing chamber. The baffle plate 61, however, establishes a substantial lateral cover plate over the portion of the spark gap 20 aligned with the inlet opening 22 of the housing to positively prevent the direct movement of the oil 7 from the sump into the spark gap.

The baffle plate 61 may be formed of the same plastic as the outer housing for convenient interconnection of the baffle to the housing upon attachment of the housing to the support. The baffle may of course be secured within the housing as by press-fit, adhesive attachment or any other suitable means.

The baffle plate 61 further includes a small opening 65 adjacent the bottom arm and thus in alignment with the oil exit or discharge opening 21. The discharge opening 65 in the baffle plate 61 is preferably slightly smaller than in the enclosure end wall 33. This further controls the outflow and assures that the oil level outside the gap area is at least as low as in the gap area and thereby essentially eliminates back flow into the sensing chamber. A somewhat larger opening 66 is formed in the baffle plate 61 at the junction of the baffle plate 61 and the top mounting arm 62. The baffle plate openings 65 and 66 provide for desired movement of the oil to the discharge control exit opening 21 and the air release opening 23.

In a practical construction, one sensor unit was specially constructed and installed in an internal combustion engine in which the normal lubricating oil volume was to be held between a minimum of 10.8 oz. and a normal 18 oz. full fill of the oil. The electrodes were vertically spaced from each other by approximately 0.025 inches at the tips, which were located outwardly of the insulating block approximately 0.125 inches. The outward extension is particularly selected to locate the gap 20 essentially at the center of the sump chamber. The housing was formed with an internal vertical dimension of approximately 0.650 inches and with a lateral width of approximately 0.310 inches. The openings on the outer face end wall were located in essentially maximum spaced relation as illustrated. The center opening had a diameter of 0.120 inches, The air discharge or outlet opening had a diameter of 0.080 inches. The more critical discharge opening was formed as having a diameter at the inner wall of approximately 0.025 inches. The baffle plate was spaced slightly from the end walls by a distance of 0.093 inches and from the electrode tips by a similar distance. The rectangular edge notches had a height of 0.135 inches and a depth or width of 0.050 inches. The sensor unit 14 was found to maintain very accurate, reliable and repeatable sensing of the dropping of the volume or sensing of the volume about a selected operating level.

Summarizing the functioning of the illustrated embodiment of the invention, the small baffled enclosure defines a small sensing chamber closely enclosing the sensing gap 20 and the electrode tips 18 and 19. The baffled chamber is sufficiently large to prevent the direct movement of the oil into engagement with the electrodes 15-16 and providing a very slight delay in the transfer of the oil from the sump 7 into the sensing chamber. The rate of transfer is associated with the volume below the selected safe level and is such to maintain an adequate supply of oil to the sensing chamber to cover electrode 20 gap so long as a minimum volume of oil is available. With the level below the selected minimum volume, the discharge rate through opening 21 will be in excess of the oil supply rate and the sensor will rapidly respond to the change in oil level in the small sensing chamber, and particularly the drop below the level of the spark gap 20 to provide a current path through the spark gap in response to the high voltage on the high voltage ignition wire. The current flow will be such as to operatively short-circuit the ignition system and stop the engine. The illustrated centralized location of sensing gap also provides a safety control in the event of excessive tipping of the engine during operation.

Simultaneously, the indicator lamp 37, where used, will be energized to indicate to the operator that the engine has ceased operation because of failure of an appropriate volume of lubricating oil.

Further, if the indicator element includes sufficient resistance or if proper resistance is added to the series ground circuit inclusive of the indicator, the indicator is engaged without shut down of the engine. For example, a lamp unit 67 in series with a current limiting resistor 68 is shown in phantom in FIG. 1, as an alternate connection to the illustration of lead 21 and lamp 37, the resistor 68 limits the current to a level which prevents shorting of the ignition current to ground. The invention thus can be conveniently adapted to a low level indicator, functioning with the result of other such visual or audible indicators.

Figures 6, 7, 8, 9, 10:
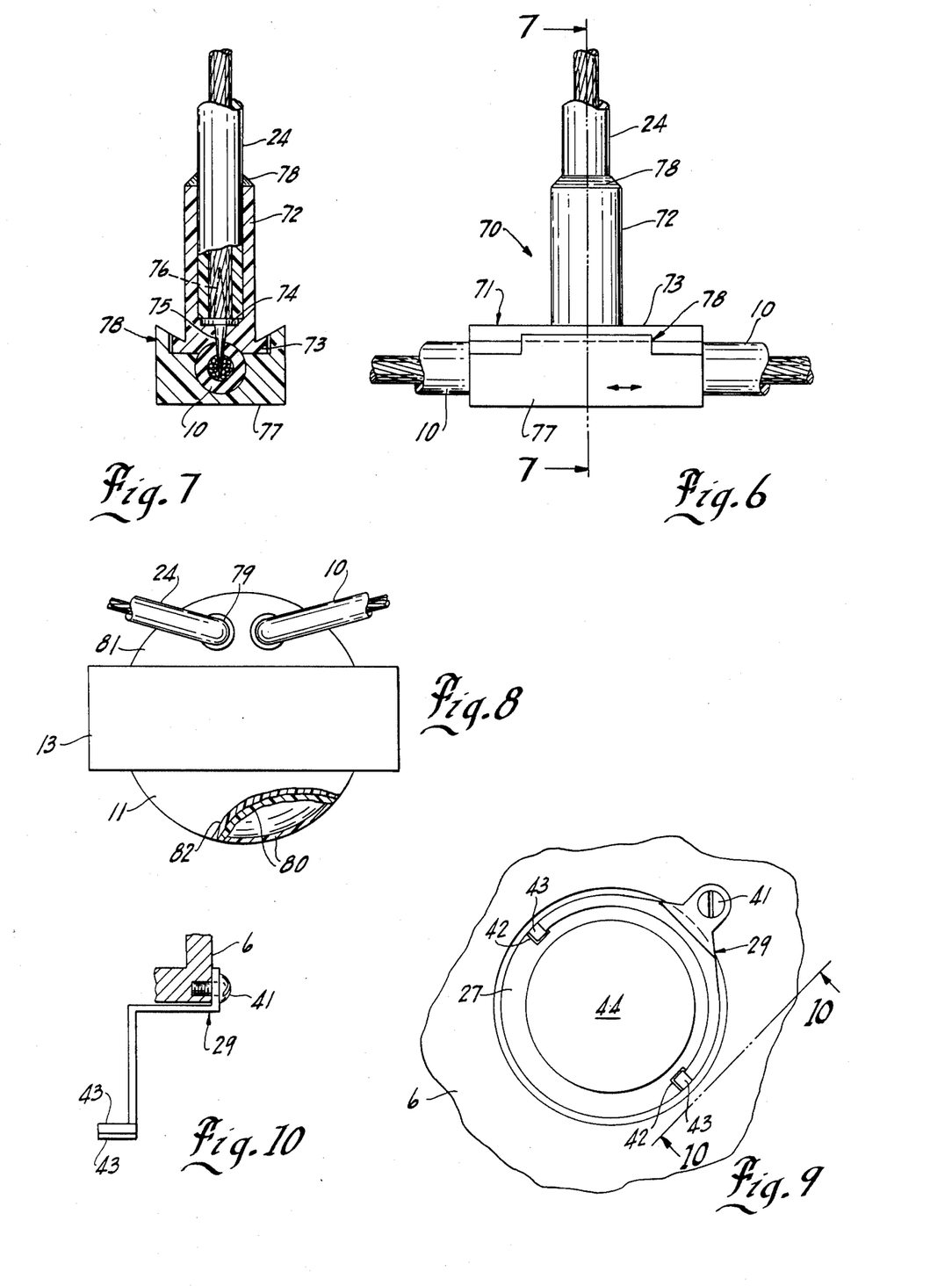
FIG. 6 is an elevational view of sensor high voltage lead connector.
FIG. 7 is a sectional view taken generally on line 7—7 of FIG. 6.
FIG. 8 is a simplified view of an alternate connection of the sensor high voltage lead.
FIG. 9 is an enlarged front elevational view more clearly showing the mounting of the sensor unit, as shown in FIG. 1.
FIG. 10 is a view taken generally on line 10—10 of FIG. 9 with the sensor unit removed and more clearly illustrating the mounting of the sensor bracket.

In the illustrated embodiment, the lead 24 is shown connected lead 10 by a tapped connector 70. The connection to the lead 10 must be maintained hermetically sealed to prevent entrance of moisture and other foreign matter which will interfere with proper engine ignition. A particularly satisfactory compressive connection is shown in FIGS. 1, 6 and 7, including a two-piece encircling collar 71 encircling lead 10 and an integral tubular stem 72 connected to lead 24. The collar 71 includes a connection base 73 integral formed with stem 72, which is a tubular member. A double point contact 74 is embedded in the wall between stem 72 and base 73. The contact 74 has oppositely projecting rigid and sharply pointed elements 75 and 76, which project through the insulation of the respective lead 10 and 24 to establish contact with the inner conductors. An outer clamp 77 is releasably coupled to the base to collapse the conductor 10 at the point of connection and establish a hermetic seal with the resilient insulating cover of lead 10. The base 73 and clamp 77 are shown as an elongated member having an inner curved surface complementing but slightly less in diameter that lead 10. The base 73 and clamp 77 are releasably interconnected by a sliding recess and projection connection 78 for coupling and decoupling to lead 10. The conductor 24 projects into the tubular stem 72 with a tight fit and the outer end is sealed as at 78 by a sealant such as an epoxy to maintain the hermetic enclosure of the connection.

Although the tapped connection may be acceptable, any connection to the ignition wire or its system connection may in some designs be considered undesireable. Lead, 24 may then be connected directly to the power supply. For example, in FIG. 8, the leads 10 and 24 are shown directly and separably connected to the coil 11 of magneto unit 12. Each lead 10 and 24 is connected by a similar hermetic connection 79. Thus, the coil 11 includes an outer impervious cover 80. A tubular hub 81 of a connection 79 projects therefrom with the corresponding lead head sealed in the hub. An epoxy coating or other sealant 82 covers the connection 79 as well as the face of coil to establish and maintain the effective seal.

The pointed-flat opposed tip configuration of the electrode tips 18 and 19 insure opening of gap 20 when the oil level in the sensing chamber drops and prevent malfunction of the sensor unit 14. The sharp, conical point of electrode 18 is preferred but other configurations may provide the same type of response. For example, if a flat, conductive strap is used for the high tension electrode, the end may be generally wedge shaped to reduce the width at the end edge and thereby minimize the effect of surface tension. All such shaped constructions are generically identified herein by the terminology of a printed element or means.

The high voltage connection insures the proper connection of the sensor into the high voltage ignition circuit, and the keyed mounting of the sensor insures proper orientation of the preferred and unique electrode configuration. The present invention may of course also be used to monitor the presence of a conductive medium such as water, in a non-conductive medium such as a lubricant, in a gear drive, a transmission or other enclosed lubricated system. Although the system is shown driven directly from the ignition system such as the magneto coil, the system may be separately powered to produce a similar response to the change in the volume of the immersion liquid. For example, a battery-driven oscillator-transformer unit may be provided as a self-contained power supply for the sensor unit to eliminate the necessity for connection to an existing ignition system design.

Other forms of indicator or controls could of course can be incorporated into such a return line circuit.

The sensor system may also include a suitable interlock means, such as a resettable control means, which is actuated by firing of the sensing gap. Thus, upon engine shutdown, a high voltage but low current surge would be created in the return lead which would set the control means. The control means is preferably connected to prevent restart of the engine without resetting of the control means, and thereby ensuring the attention of the operator to the sensed low volume condition.

The illustrated embodiment of the present invention thus provides a multi-featured improved sensor for monitoring the related presence of a nonconductive medium and a conductive medium based on the unique separate sensing chamber. Various other forms and modifications of a sensor using the basic sensing chamber can of course be made depending upon the application and the various and different specifications which may be required, within the present invention as defined in the accompanying claims.

Various modes of carrying out the invention are contemplated as being within the scope of the following claims particularly pointing out and distinctly claiming the subject matter which is regarded as the invention.

I claim:

1. A submersible sensor adapted to be immersed in a submerging liquid within a containing means for sensing electrically different conductive mediums in said liquid, said submerging liquid having a minimum selected level and a maximum selected level in said containing means, comprising first and second electrodes spaced from each other with opposed ends to define a sensing gap, means in said sensing gap between said electrodes to vary the conductivity of the gap with the conductivity of the mediums in said gap, a flow control enclosure secured defining a chamber about said opposed ends of said electrodes and said gap, said flow control enclosure having mounting means for attachment to said containing means and said flow control enclosure includes at least one first opening means located to establish flow of said submerging liquid into said chamber at a rapid inflow rate to immerse said opposed ends and at least one second opening means constructed and arranged to establish the flow of said submerging liquid from the chamber at an outflow rate less than said flow rate of said first opening in response to movement of submerging liquid about the enclosure, and said first opening means being located to introduce liquid into said chamber with said liquid level substantially at the minimum selected level and below the maximum level to maintain flow into said first opening means and said liquid in said chamber flowing from said chamber through said second opening means with said submerging liquid substantially at said minimum level and below said minimum level.

2. The sensor of claim 1 wherein said first electrode includes a pointed end, and said second electrode includes a blunt end spaced from said pointed end to form said gap with conduction from the outermost point of said pointed end and in the direction of said pointed end to the blunt end.

3. The sensor of claim 1 wherein said first electrode is connected to a high tension voltage source and said second electrode is connected to a ground return lead, and a control means is connected in series in said return lead.

4. The sensor of claim 1 including a support for said electrodes and control enclosure and wherein said electrodes have the ends vertically oriented and spaced whereby said sensing gap is vertically oriented, and a keying means on said support to establish said vertical orientation.

5. The sensor of claim 1 wherein said first opening means to said flow control enclosure includes an entrance opening generally aligned with said gap, and means interposed between said entrance opening and said gap to prevent direct entrance of liquid from the exterior of said flow control enclosure into said gap.

6. The sensor of claim 5 wherein said means interposed between said entrance opening and said gap includes a baffle plate means redirecting the incoming liquid laterally of said electrodes and gap.

7. The sensor of claim 6 wherein said enclosure is vertically mounted and said second opening means includes a discharge opening at the lower end, said baffle plate means extends downwardly over said discharge opening and having a discharge opening aligned with said first named discharge opening, the flow rate through the discharge opening in the baffle plate being less than the flow rate through the discharge opening in the enclosure for a given level in said enclosure.

8. The sensor of claim 7 wherein the discharge opening in the baffle plate is slightly less in cross-section than the discharge opening in the enclosure to establish said differential flow rates.

9. A submersible sensor adapted to be immersed in a liquid within a containing means for sensing electrically different conductive mediums in said liquid, said submerging liquid having a minimum selected level and a maximum selected level in said containing means, comprising an insulating support, a high-tension electrode secured in said support and having an L-shaped protion projecting from said support, said L-shaped portion terminating in a pointed end, a second reference rod-like electrode secured in said support and having a blunt end located in opposite spaced realtion to the outermost axial end of said pointed end to define a sensing gap responsive to the conductivity of the medium within said gap and establishing conduction from said pointed end to said blunt end, a flow control enclosure secured to said support and defining a chamber about said electrodes including said ends and said sensing gap, said flow control enclosure having mounting means for attachment to said containing means and said flow control enclosure including at least one first opening means located to establish flow of said submerging liquid into said chamber at a rapid inflow rate to immerse said ends of said electrodes and at least one second opening means constructed and arranged to establish the flow of said submerging liquid from the chamber at an outflow rate less than said inflow rate of said first opening means in response to movement of said submerging liquid about the enclosure, and said first opening means being located to introduce said submerging liquid into said chamber with said liquid level substantially at the minimum selected level and below the maximum level to maintain flow into said first opening means and said liquid in said chamber flowing from said second opening means with said submerging liquid substantially at said minimum level and below said minimum level.

10. The sensor of claim 9 wherein said electrodes have the ends of the elctrodes vertically oriented to form a vertically extending sensing gap, and said support having a keying means to establish said vertical orientation.

11. The sensor of claim 9 wherein said first opening means in said flow control enclosure includes an entrance opening generally aligned with said gap, and a baffle means interposed between said entrance opening and said gap to prevent direct entrance of liquid from the exterior of said enclosure into said flow control gap.

12. The sensor of claim 11 wherein said flow control enclosure is vertically oriented and said second opening means includes a discharge opening located beneath said entrance opening, said baffle means is a plate essentially corresponding to the interior of said enclosure, said plate having laterally spaced opening aligned with said discharge opening of said flow control enclosure, the flow rate through the discharge opening in the baffle plate being less than the flow rate through the discharge opening in the enclosure for a given level in said enclosure.

13. The sensor of claim 12 wherein the discharge opening in the baffle plate is slightly less in cross-section than the discharge opening in the enclosure.

14. The sensor of claim 9 having a high voltage lead connected to said high tension electrode having a pointed end and a return lead connected to said second electrode having said blunt end, a signal means connected in series in said return lead to identify a change in the conductivity of said gap.

15. The sensor of claim 14 for controlling a load and wherein said signal means includes a resistance to limit the current in said gap and thereby maintain operation of the load with conduction through said gap.

16. The sensor of claim 9 wherein said high tension electrode and said reference electrode have connecting ends of differing configuration.

17. The sensor of claim 9 wherein said support is a molded member having said electrodes molded therein and projecting outwardly from opposite sides thereof.

18. The sensor of claim 17 wherein said high voltage electrode is a rod-like member having an exterior terminal end shaped to define a spring means adapted to resiliently engage a tubular terminal, and said reference electrode having a terminal end of a distinctly different shape.

19. The sensor of claim 18 having an insulating tower integrally molded to said support and extending outwardly over said high volatge electrode, said tower including a plurality of annular projections, and said high voltage electrode including an insulating boot of a resilient material and releasably fitted over said tower.

20. A submersible sensor adapted to be immersed in a submerging liquid within a housing for sensing electrically different conductive mediums in said liquid, comprising an insulating support, a high tension electrode secured in said support, a second reference electrode secured in said support and located in opposed spaced relation to said first electrode to define a spark gap responsive to the conductivity of the medium within said gap, a flow control enclosure secured to said support and defining a chamber closely spaced about said electrodes including said gap, said flow control enclosure including at least a first opening to establish flow of a submerging liquid into said chamber to immerse said opposed ends and a second opening for restricted discharge of said liquid from said second opening, said first and second openings being constructed and arranged to delay the flow of liquid from the chamber in response to movement of submerging liquid about the flow control enclosure, and a baffle means interposed between said openings and said gap to prevent direct entrance of the liquid from the exterior of said flow control enclosure through said entrance opening into said gap.

21. The sensor of claim 20 wherein said electrodes are vertically oriented with an upper electrode and a lower electrode, said lower electrode having a blunt end, said upper electrode having a pointed end located in opposed relation to said blunt end of said lower electrode and establishing a conductive path from said pointed end to said blunt end.

22. The sensor of claim 21 wherein said flow control enclosure includes an outer flat end wall having three vertically spaced openings including said first opening generally aligned with said gap, a said second opening is a bottom discharge opening for discharge of said submerging liquid from said flow control enclosure and a top release opening for releasing of air from said flow control enclosure.

23. The sensor of claim 22 wherein baffle means is essentially a solid plate corresponding to the internal configuration of the enclosure adjacent the spark gap and located in spaced relation to said electrodes and said end wall, said plate having edge notches on the side edges generally in alignment with the spark gap and the inlet opening, said baffle unit having openings aligned with said discharge opening and said release opening.

24. The sensor of claim 23 wherein said opening in the baffle plate aligned with said discharge opening has a smaller cross-section than said discharge opening.

25. The sensor of claim 20 wherein said flow control enclosure includes a cup shaped housing having a rectangular shape with a width slightly greater than the thickness of the electrodes and a vertical height slightly greater than the spacing of the electrodes, said housing being releasably secured to the support to define said enclosure, said housing having an outer flat end wall, said first opening being centrally located in said end wall for defining the oil entrance opening, said second opening being a small bottom opening defining the restricted discharge opening, and having a top opening in said end wall defining an air release opening for releasing air from said housing when liquid enters through said oil entrance opening.

26. The sensor of claim 25 wherein said baffle includes a baffle plate secured within said cup shaped housing and located between the electrodes and the outer end wall of said cup shaped housing, said baffle plate having side edge notches with the lower edge of the notch aligned with the entrance opening for free flow of oil around the baffle plate, the bottom end of said baffle plate having a small opening aligned with the discharge opening of said housing, and the upper end of said baffle plate having an opening aligned with said release opening of said housing.

27. The sensor of claim 20 in combination with a liquid sump having a side wall mount opening and wherein said support is a molded plastic member releasably secured within said side wall opening of said liquid sump, said electrodes are rod-like electrodes embedded within and extending through said molded support, said electrodes having inner ends bent to extend toward each other, one of said electrodes having an essentially sharp pointed end, a second of said electrodes having a relatively blunt end, said support member and mounting opening being constructed to establish vertical orientation of said electrodes with said pointed end located above said blunt end.

28. The sensor of claim 20 wherein said support is formed with an integral outwardly extending tower about the high tension electrode, said tower including a plurality of adjacent annular radial projections to significantly increase the surface creepage path to the high tension electrode and thereby minimizes the probability of creation of parasitic currents from the high tension electrode.

29. The sensor of claim 20 wherein said high tension electrode has a U-shaped end and said reference electrode has an end distinctly different shape.

30. The sensor of claim 20 wherein said sensor support is adapted to be secured within a correspondingly shaped sensor opening in the housing and including a clamp bracket having means for securing said clamp bracket to the housing adjacent said sensor opening, said clamp bracket and said sensor support having a plurality of interrelated engaging members restricting placement of said sensor support in said sensor opening in a single orientation.

31. The sensor of claim 30 wherein said clamp bracket includes oppositely extending arms terminating in lateral end projections of a distinctly different cross-section and overlying said sensor support, said sensor support having first and second recesses aligned with and receiving said projections, said recesses having a cross-section corresponding to one of said projections whereby said bracket can be secured to said housing with only one orientation of said sensor support.

32. In combination, an internal combustion engine, a high volatge source in an ignition system and having an oil sump and a splash lubrication means for moving oil from said sump to operating components, said oil having a minimum selected level and a maximum selected level in said sump, a sensor unit comprising a submersible sensor support secured to said sump and immersed in said oil for sensing said oil, a high tension electrode secured to said support and connected to the high voltage source of said ignition system, said high tension elelctrode having a pointed end, and a second reference electrode secured to said support having an outer end located in opposed spaced relation to said pointed end to define a sensing gap responsive to the conductivity of the oil, a flow control enclosure secured to said support and defining a chamber about said electrodes including said ends of said electrodes and said gap, said flow control enclosure including at least one first opening means located to establish flow of said oil into said chamber at a rapid inflow rate to immerse said ends of said electrodes and at least one second opening means constructed and arranged to establish the flow of said oil from the chamber at an outflow rate less than said inflow rate of said first opening means in response to movement of said oil about the enclosure, said first opening means being located to introduce oil into said chamber with said oil level substantially at the minimum selected level and below the maximum level to maintain flow through said chamber and from said second opening means with sadi submerging liquid substantially at said minimum level and below said minimum level, said support and said sump being constructed and arranged whereby said gap is located at the center of said oil in said sump.

33. The combination of claim 32 wherein said electrodes have the ends of the electrode vertically oriented, and said support having a keying means to establish said vertical orientation upon mounting of said support to said sump.

34. The combination of claim 32 wherein said first opening means of said enclosure includes an entrance opening generally aligned with said gap, and a baffle means interposed between said entrance opening and said gap to prevent direct entrance of the oil from the exterior of said enclosure into said gap.

35. The combination of claim 32 wherein said support includes a molded plastic member having said electrodes molded therein.

36. The combination of claim 32 wherein said engine includes at least one spark plug and a magneto for generating a high voltage pulse for firing said spark plug, said magneto including an output coil having a moisture proof covering, first and second high voltage leads connected to said coil and passing through said covering, and sealing means secured to said cover and to said leads to hermetically seal the connection of said leads to said coil, said first high volatge lead being connected to said spark plug, and said second high voltage lead being connected to said high voltage electrode of said sensor.

37. The combination of claim 32 wherein said ignition system includes a high voltage spark plug wire having an outer insulating cover, a T-shaped connector secured to said spark plug wire and establishing a lateral connection threfrom, said T-shaped connector including a T-shaped base member having an elongated base with a lateral tube extension, a conductor in said tubular extension outwardly through said base and terminating in a rigid pointed end, a releasable clamp member releasably affixed to said base and clamping said base member firmly against said spark plug wire to hermetically seal the base to the wire and to move said rigid pointed end through said outer insulator cover.

38. The combination of claim 32 including a spark plug lead connected to said high voltage source, and a separate sensor lead connected to said high voltage source and to said high voltage electrode.

39. The combination of claim 32 including a low level indicator means connected between said reference electrode and ground, said indicator means having sufficient resistance to prevent shorting of the ignition system.

40. The combination of claim 39 wherein said high voltage electrode is a rod-like member having an exterior terminal end shaped to define a spring means adapted to resiliently engage a tubular terminal, and said reference electrode having a terminal end of a distinctly different shape than said exterior terminal end of said high voltage electrode.

41. The combination of claim 32 having an insulating tower secured to said support and extending outwardly over said high voltage electrode, said tower including a plurality of annular projections, and said high voltage electrode including an insulating boot of a resilient material and releasably fitted over said tower.

42. The combination of claim 32 wherein said sump includes a casing having a sump opening, and including a clamp bracket, means securing said clamp bracket to said casing adjacent said sump opening, said bracket and said sensor support having a plurality of interrelated engaging members restricting placement of said sensor support in said opening in a single orientation.

43. The combination of claim 42 wherein said bracket includes oppositely extending arms terminating in lateral end projection of a distinctly different cross-section and overlying said support, said support having first and second recesses aligned with and receiving said projections, said recesses having a cross-section corresponding to one of said projections whereby said bracket cover can be secured to said casing with only one orientation of said support.

44. The combination of claim 32 including an indicating means, a current limiting means, means connecting said indicating means and said current limiting means between said reference electrode and ground, said current limiting means being selected to limit the current flow through said gap to maintain firing of said ignition system.

45. An internal combustion engine having a high volatge ignition system and including a splash lubrication system and having an oil sump with a bottom cover having a sidewall, comprising an electrically responsive sensor means, including an enclosure for enclosing spaced rod-like electrodes defining a sensing gap within a sensing chamber, one of said electrodes being a high voltage electrode to be connected into the high voltage side of the ignition system, the other electrode being a return electrode, a molded plastic support adapted to be releasably secured within a side wall opening of said sump cover, said rod-like electrodes molded within and extending through said molded support in vertically spaced relation to each other, inner ends of said electrodes being bent to extend toward each other, said high voltage electrode having a sharp pointed end, said return electrode having a flat end, a bracket secured to said cover, said support and said bracket having cooperating interengaged members to ensure said vertical orientation of the electrodes with the high voltage electrode located above the return electrode, a housing secured to said support and forming an end wall of the enclosure, said housing having an outer end flat wall spaced slightly from the electrodes, three vertically spaced openings including an inlet opening substantially at the vertical height of the sensing gap for entrance of oil into the enclosure and a second discharge opening located at the lower end of said flat wall for restricted outflow of oil from the enclosure and a third release opening located at the upper end of said flat wall for discharge of air and other fumes within the enclosure, a baffle plate interposed between said flat wall and said sensing gap, said housing being generally rectangular in shape and having a width slightly greater than the thickness of the electrodes and a vertical height slightly greater than the spacing of the electrodes, said baffle plate including small notches on the side edges with the lower end of the notches generally in alignment with the sensor gap and the inlet opening, said baffle plate having upper and lower mounting arms extending to the opposite sides of the plate and frictionally engaging the top and bottom walls of said housing to locate the baffle plate in spaced relation to said flat wall and said electrodes, said baffle plate having a bottom opening of cross-section slightly smaller than the bottom opening in the flat wall and a top opening aligned with the top opening in the flat wall, said support having an intergral outwardly extending tower about the high voltage electrode, said tower including a plurality of adjacent annular radial projections, said high voltage electrode having an outer terminal spring end, a high volatge tension lead having a tubular contact adapted to telescope over said spring end and having an outer resilient boot telescoped over said tower and frictionally gripping said tower, said support locating said sensing gap at the center of the oil sump and at the selected minimum safe oil level, and a high voltage source connected to said high voltage tension lead, a high voltage spark plug lead connected to said source.

46. The engine of claim 45 wherein said high voltage source is a magneto driven in synchronism with said engine and includes an output coil, a spark plug lead, a first hermetically sealed connection means connecting said spark plug lead to said coil, a second hermetically sealed connection means connecting said high tension lead to said coil.

47. The engine of claim 45 wherein a connection means includes a two piece connector encircling said high voltage spark plug lead, said connector including a T-shaped base member having a base wall having a curvature complementing said high voltage spark plug lead and having a stem, a conducting rod in said stem extending through said base member, the opposite ends of said rod having sharp pointed ends, and an outer clamp member releasably secured to said base member and having a curvature complementing said high voltage spark plug lead.

* * * * *

UNITED STATES PATENT AND TRADEMARK OFFICE
CERTIFICATE OF CORRECTION

PATENT NO. : 4,745,895

DATED : May 24, 1988

INVENTOR(S) : RICHARD W. SEILENBINDER, ET AL

Page 1 of 2

It is certified that error appears in the above-identified patent and that said Letters Patent is hereby corrected as shown below:

On the Face of the Patent: Col. [73], delete "Brookfield" and substitute therefor --- Milwaukee ---; In the Specification: Col. 1, line 66, delete "2,123,400" and substitute therefor ---2,123,461---, Col. 1, line 67, delete "Burschker" and substitute therefor ---Burschkies---, Col. 2, line 43, delete "Yanagushirt" and substitute therefor ---Yamaguchi---, Col. 4, line 4, delete "diverse" and substitute therefor ---define---, Col. 6, line 32, after "formed" insert ---as---, Col. 15, line 57, delete "21" and substitute therefor ---25---, Col. 16, line 16, delete "that" and substitute therefor ---than---, Col. 16, line 68, delete "can"; In the Claims: Col. 18, line 37, delete "realtion" and substitute therefor ---relation---, Col. 19, line 3, after "of" insert ---the---, Col. 19, line 10, delete "opening" and substitute therefor ---openings---, Col. 21, line 7, after "end" insert ---of---, Col. 21, line 55, delete "sadi" and substitute therefor ---said---, Col. 21, line 61, delete "electrode" and substitute therefor ---electrodes---, Col. 22, line 23, delete "tube" and substitute therefor ---tubular---, Col. 22, line 24, after "extension" insert ---extending---, Col. 22, line 60, delete "projection" and substitute therefor

UNITED STATES PATENT AND TRADEMARK OFFICE
CERTIFICATE OF CORRECTION

PATENT NO.   :  4,745,895

DATED        :  May 24, 1988

INVENTOR(S)  :  RICHARD W. SEILENBINDER, ET AL

It is certified that error appears in the above-identified patent and that said Letters Patent is hereby corrected as shown below:

---projections---, Col. 23, line 7, delete "volatge" and substitute therefor ---voltage---

Signed and Sealed this

Ninth Day of January, 1990

Attest:

JEFFREY M. SAMUELS

Attesting Officer     Acting Commissioner of Patents and Trademarks